(12) United States Patent
Grisamore et al.

(10) Patent No.: US 6,445,791 B1
(45) Date of Patent: Sep. 3, 2002

(54) SYSTEM AND METHODS FOR MODEM INTERFACE

(75) Inventors: Robert Thomas Grisamore; Kartika Putra Prihadi, both of Austin; Eric Swanson, Buda, all of TX (US); Karl Nordling, Raleigh, NC (US); Axel Thomsen, Austin, TX (US)

(73) Assignee: Cirrus Logic, Inc.

( * ) Notice: Subject to any disclaimer, the term of this patent is extended or adjusted under 35 U.S.C. 154(b) by 0 days.

(21) Appl. No.: 09/370,404

(22) Filed: Aug. 9, 1999

(51) Int. Cl.[7] .......................... H04M 1/00; H04M 9/00
(52) U.S. Cl. .................. 379/402; 379/403; 379/404; 379/405; 379/390.04; 379/391; 379/392; 379/399.01; 379/93.05; 379/406.01; 379/406.07
(58) Field of Search .................. 379/398–400, 379/402–405, 93.05, 93.08–93.09, 93.26, 413.02–413.04, 390.04, 391, 392, 406.01–406.16

(56) References Cited

U.S. PATENT DOCUMENTS

| | | | | |
|---|---|---|---|---|
| 4,795,898 A | * | 1/1989 | Berstein et al. | 235/487 |
| 5,121,080 A | | 6/1992 | Scott, III et al. | |
| 5,541,990 A | * | 7/1996 | Rahamim | 379/402 |
| 5,602,912 A | * | 2/1997 | Hershbarger | 379/338 |
| 5,655,009 A | * | 8/1997 | Arai et al. | |
| 5,734,703 A | * | 3/1998 | Hiyoshi | 379/402 |
| 5,856,758 A | * | 1/1999 | Joffe et al. | 330/85 |
| 5,999,597 A | * | 12/1999 | Brown | |
| 6,208,732 B1 | * | 3/2001 | Moschytz et al. | 379/402 |

\* cited by examiner

*Primary Examiner*—Forester W. Isen
*Assistant Examiner*—Ramnandan Singh
(74) *Attorney, Agent, or Firm*—James J. Murphy, Esq.; Winstead Sechrest & Minick

(57) ABSTRACT

An interface for coupling a modem port with a transmission line includes a hybrid converter having a variable gain amplifier coupling a transmit path of a first differential polarity and a received path of a second differential polarity.

19 Claims, 3 Drawing Sheets

US 6,445,791 B1

SYSTEM AND METHODS FOR MODEM INTERFACE

BACKGROUND OF THE INVENTION

1. Field of the Invention

The present invention relates in general to modems and in particular to circuitry for impedance matching between a modem port and a telephone line and systems and methods using the same.

2. Description of the Related Art

With the advent of the Internet and the World Wide Web, most consumers now demand the inclusion of an integrated high speed modem when purchasing a new personal computer. Moreover, consumers are increasingly demanding that these modems not only support the high speed telephonic exchange of computer generated data, but also of voice and facsimile data as well. Additionally, features such as support for echo-canceled digital speaker phones and upgradability to meet the requirements of the newer Digital Simultaneous Voice and Data (DSVD) and video conferencing standards are often also desirable. Thus, the designer of modem chipsets is typically faced with a number of significant technical challenges.

One particular challenge is the design of the interface of the typical 4-wire differential modem port to the full-duplex 2-wire common telephone lines. Either a duplexor or a 2-wire to 4-wire hybrid converter is required to separate the transmit and receive signals at the interface. In the case of a hybrid converter, a resistor-capacitor network is carefully matched with the telephone line impedance reflected across a transformer. In the ideal case, the crossover of transmit signals into the receive path is eliminated by signal cancellation. However, resistors are difficult to match against each other and the telephone line impedance may vary from connection to connection. As a result, transmitter to receiver signal cancellation suffers and a significant amount of transmit signal can be present at the input to the modem analog to digital converter.

Given the demand for increased modem performance, the need has arisen for circuits, systems and methods for interfacing a modem with a telephone line.

SUMMARY OF THE INVENTION

According to the principles of the present intention, an interface is disclosed for coupling a modem port with a transmission line. A hybrid converter is included which has a variable gain amplifier coupling a transmit path of a first differential polarity and a received path of a second differential polarity.

The present inventive principles provide for the cancellation of transmit signals in the received path of the embodying modem by allowing the modem interface impedance to be adjusted with respect to the telephone line impedance. As a result, the large dynamic range of the received path can be preserved notwithstanding significant variations in telephone line impedance.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The principles of the present invention and their advantages are best understood by referring to the illustrated embodiment depicted in FIGS. 1–5 of the drawings, in which like numbers designate like parts.

Figure 1:
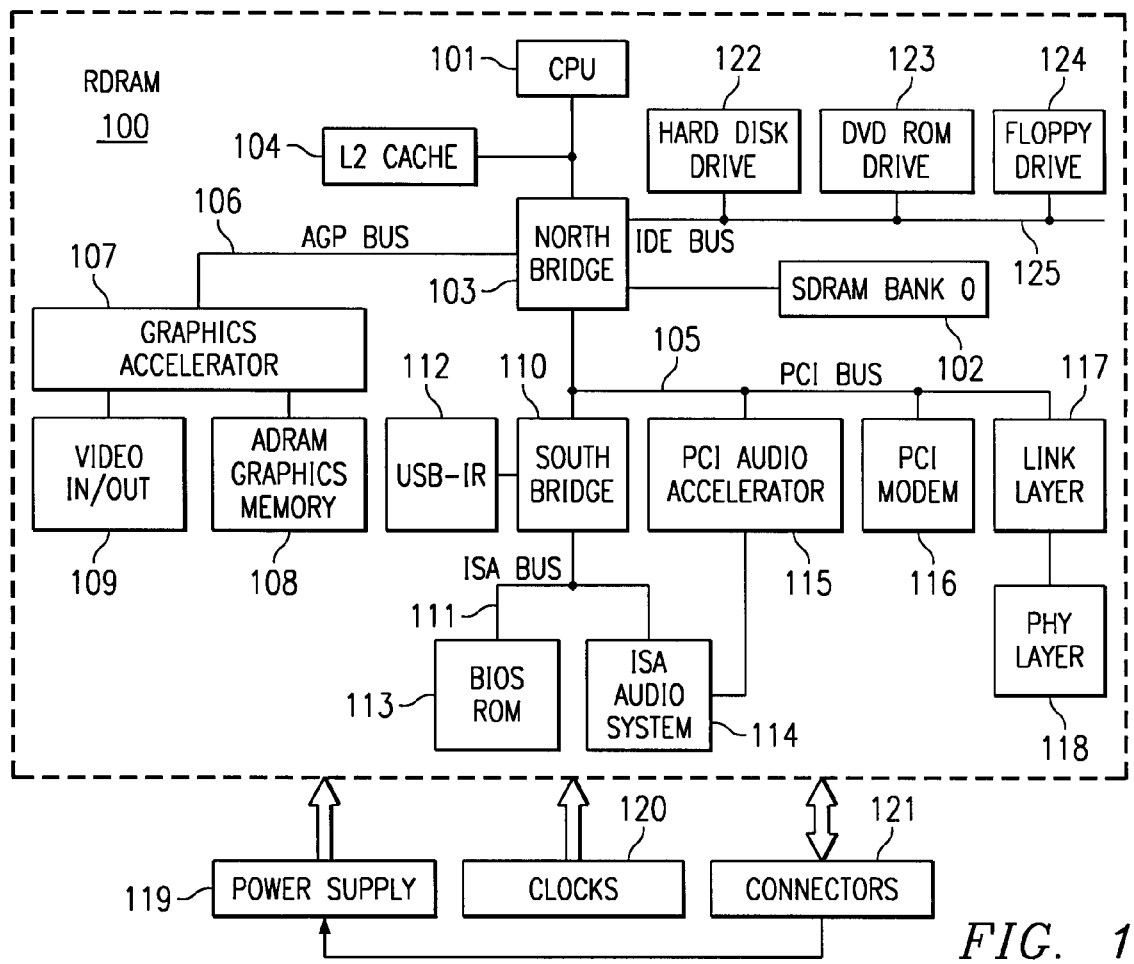
FIG. 1 is a diagram of an entertainment computer system embodying the teachings of the present invention.

FIG. 1 is a diagram of an entertainment computer system 100 embodying the teachings of the present invention. System 100 advantageously integrates the functionality of a general purpose microprocessor based computer system with the high quality audio and visual capability of entertainment system on a single printed circuit (PC) board.

As discussed further below, system 100 can be integrated with peripheral devices such as a digital video disk (DVD) player, a floppy drive, and a hard drive, in a single compact package. Among the functional features, system 100 incorporates a high speed modem for external communications, circuitry for processing 3D graphics data required for such software applications as gaming, and circuitry for generating high quality video and audio from data received from a digital video disk (DVD) and/or compact disk (CD). Additionally, system 100 is able to generate audio and video for traditional television signals in the NTSC format.

system 100 is based on a central processing unit 101. The CPU runs the operating system software, provides overall system management, and generates graphics data. CPU 101 may be for example an Intel Pentium® MAX., Cyrix M2, AMD K6, or similar microprocessor operating with a clock speed of between 160 and 300 MHZ. In the present embodiment, the operating system is the Microsoft Windows 98 system which allows for universal serial bus (US) expansion, supports DirectX5.0 graphics processing software, the advanced configuration and power interface (ACP), and allows for DVD processing via the ActiveMovie 2.0 software and the Windows driver model (WDM).

System memory 102 supports CPU 101 through north bridge (core logic) 103. System memory 103 may be up to 128 Mbytes of SDRAM (synchronous dynamic random access memory). CPU 101 is additionally supported by an L2 cache 104 which may be for instance 256 or 512 kbytes of static random access memory (SRAM).

North bridge 103 interfaces CPU 101, system memory 102, and the devices on PCI bus 105 and 66 Mhz AGP (accelerated graphics port) bus 106. With regards to the system memory, north bridge 103 acts as the system "host" managing buffers and registers in system memory required to support devices on the PCI and AGP buses. North bridge 103 also controls the memory operations required by the DRAMs of system memory 102, including physical address generation, read/write control, and cell refresh. North bridge 103 can also operate as the PCI bus master. In the illustrated embodiment, north bridge 104, is a SiS5592 chip set which includes integrated IDE Mode 3 and Mode 4 and Ultra-DMA/33 support, along with the PCI bus mastering capability. This device supports two separate data channels and four drives. North bridge 103, along with the south bridge discussed below, collectively form the system core logic chip set.

Graphics processing is based on graphics accelerator 107, operating off of AGP bus 106 (accelerator 106 is the master of AGP bus 106 in compliance with the AGP 1.0 specification), which in the illustrated embodiment is a Cirrus Logic CL-GD5465 high performance graphics accelerator which supports an Intel AGP hardware and Microsoft Direct3D graphics software. Graphics accelerator includes a 64-bit graphics engine with 3D games acceleration, and performs, among other things, a variety of texturing operations, the rendering of points, lines and triangles during display image generation and refresh, mono rasterization, blending, fog and transparency control, as well as video and MPEG2/DVD acceleration. In the illustrated embodiment, graphics accelerator also includes GUI (graphics user interface) accelerator which performs such tasks as hardware clipping, BitBlits (bit boundary block transfers) within graphics memory 108 and color expansion. An integrated VGA controller and an output to support a TV tuner are also preferably included.

Graphics memory 108 stores color-buffer, z-buffer, video, and texture data and acts as the traditional video/graphics frame buffer. In the illustrated embodiment, graphics memory 108 utilizes a Rambus® memory architecture running up to 600 Mbytes/second with 4 Mbytes of RDRAM.

Video data is exchanged with graphics controller 106 through video port 109. Video port includes a decoder, such as an ITT VPX3225 multi-standard decoder, for decoding S-video, NTSC or PAL formatted video data into digital form for use by the graphics processor. Video port 109 also supports the input of NTSC or PAL video from a Cirrus Logic Legend I TV-tuner/DVD board which includes a Philips FI1236 TV tuner module, a Sony CXA1724S TV audio decoder and an IBM CD1V MPEG2 decoder. Additionally, video port 109 includes a television encoder, such as a Cirrus Logic GD1053 NTSC/PAL encoder with flicker-filter preprocessor, which receives VGA and MPEG data from graphics processor 109 and outputs signals in compliance with either the NTSC or PAL (interlaced or noninterlaced) television formats for driving a television display. Additionally, the television encoder performs such tasks as flicker-filtering, insertion of closed captions, luminance and chrominance control, scaling, and window within window control.

South bridge 110 bridges PCI bus 105 and an ISA bus 111. South bridge 110 also provides the interface for receiving infrared (IR) signals through an IR window from a remote controller or keyboard and a universal serial bus (USB), collectively shown at block 112.

BIOS ROM 113 holds both the system bios along with an integrated video BIOS for graphics accelerator 107. In the illustrated embodiment, ROM 113 comprises 2 Mbits of flash memory with segmented ROM support on ISA bus 111. The system BIOS is preferably the Phoenix BIOS with ACPI and PnP.

Coupled to ISA bus 111 is an ISA audio system 114 which operates in conjunction with a PCI-based audio accelerator 115 coupled to PCI bus 105. Audio system 114 is preferably a Cirrus Logic CS4235 single chip ISA audio system. Digital audio data can be received from ISA bus 111 and processed using Microsoft Windows System or Sound Blaster/Sound Blaster Pro software. Data can also be received from a wavetable, such as a Cirrus Logic CS9236 wavetable synthesizer or a CD-ROM player. FM digital data can be synthesized on-chip. Data is exchanged directly with audio accelerator 115 through a dedicated interface.

Functionally, audio system 114 system can perform a number of tasks on the input digital audio data received from ISA bus 111. For example, the digital audio data can be converted into analog form and mixed with analog audio data input directly to the device. The analog data can come from such sources as a microphone, a monophonic audio source, or a stereo audio source, such as a CD player. The mixed data can then converted to digital audio and output to ISA bus 111 or audio accelerator 115. Mixed data can also be 3D enhanced and output as analog data.

Accelerator 115 is a DSP (digital signal processor) or similar processor based device, preferably a Cirrus Logic CS4610 PCI Audio Accelerator. Accelerator 115, along with its application and driver software, performs various audio processing functions simultaneously on multiple streams of data being exchanged with host based memory buffers in system memory 102 via PCI bus 105 and audio system 114. Generally, accelerator 115 provides acceleration for audio applications used in gaming, DVD and music playback, and video conferencing. Exemplary software audio applications which are supported by accelerator 115 are various versions of Microsoft DirectSound, DirectShow, and Aureal A3D Interactive. Some specific examples of the processing done by accelerator 114 are multichannel mixing and sample rate conversion, Dolby Digital and MPEG2 decoding, and wavetable synthesis and effects processing. In the illustrated embodiment, accelerator 115 includes a DMA controller with hardware scatter-gather for transferring data streams to and from the host memory buffers, advantageously minimizing host (north bridge 103) memory loading requirements. Additionally, in the illustrated embodiment, the accelerator-PCI bus interface can function as the PCI bus master.

Also operating of PCI bus 105 is a PCI-based modem 116, such as a Cirrus Logic CL-MD5622 Controllerless Modem, which supports both data and voice telephony, and FAX transmissions. In the controllerless embodiment, the host (north bridge 103) acts as the controller and modem 116 employs a DSP for such tasks as data modulation and demodulation, and interfacing with the telephone system and peripheral devices such as speakers and headsets. Modem 116, along with a microphone and a speaker or headset, supports full-duplex, echo-canceled digital voice telephony. Data modulation can be performed in accordance with the 3Com x2 software technology, ITU-V.34 software at 33.2 to 2.4 kbps in symmetric and asymmetric operation, along with ITU versions V.32 bis, V.23, V.22 bis, and V.21, and Bell 212A and 103 software. FAX modulation may be performed using ITU-T V.17 and V.19 software to 14.4 kbps. Modem 116 can receive data at up to 56 kbps.

Link layer 117 and physical layer 118, in combination, allow for an IEEE 1394 connection to be established with system 100. More particularly, link layer 117 interfaces with PCI bus 105 and physical layer 118 interfaces with at least one IEEE 1394 external port. Link layer 117 may be for example a Texas Instruments TSB12LV22 1394 Host Controller and physical layer 118 a Texas Instruments TSB41LV03 1394 Three Port Cable Transceiver/Arbiter.

Power supply 119 is a 90 watt power supply sourcing 3.3 v, 5 v, 12 v and 5 vAux power in accordance with the SFX standard. Preferably, power supply 119 also conforms with the Intel PC98 Power Supply Specification. Lower voltages can also be jumper-selected from an on board power supply.

The system clocks are generated by clock circuitry 120. Clock circuitry 120 can be based for example on a Cypress CY2265 clock driver and a 14.31818 MHz crystal oscillator. Additional dedicated crystals/crystal oscillators are used, as required, by some of the individual devices themselves.

Connector block 121 represents the external connectors, for connecting to case-external devices, and internal connectors for connecting system 100 with devices packaged with system 100 as a single unit.

Figure 2:
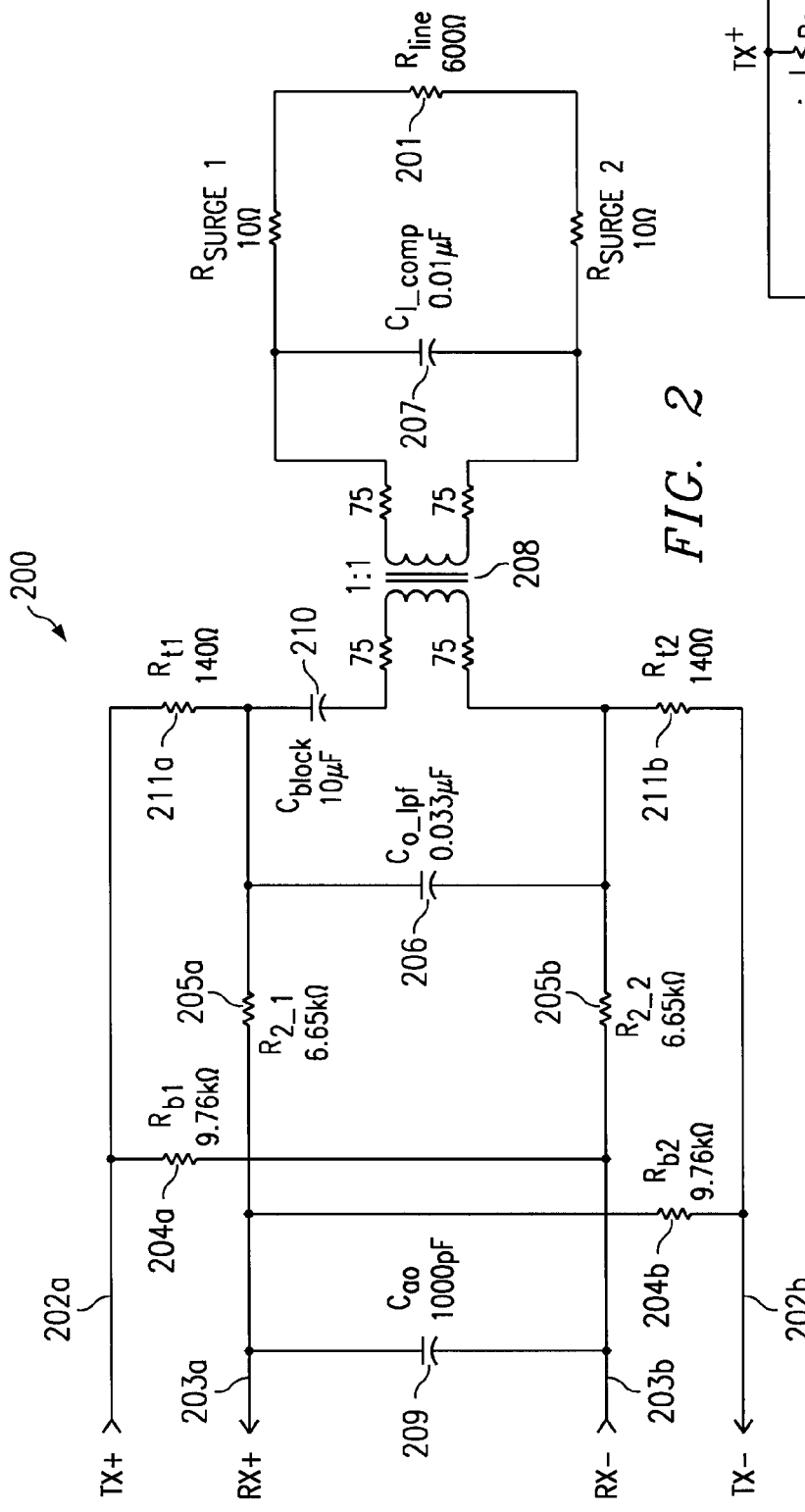
FIG. 2 is an diagram illustrating a typical 2-wire to 4-wire hybrid circuit which could be utilized to interface a modem with a 2-wire telephone line.

FIG. 2 is an electrical schematic diagram illustrating a typical 2-wire to 4-wire hybrid circuit 200 which could be utilized to interface a modem, such as modem 116, with a 2-wire telephone line. The resistance and capacitance values are exemplary, and may vary from application to application. In this example, 2-wire telephone line is modeled by resistor 201, which will assumed to be 600 ohms for discussion purposes. On the modem side, there is a differential pair of transmit terminals 202a and 202b, labeled TX+ and TX− respectively, and a differential pair of receive terminals 203a and 203b, labeled RX+ and RX− respectively.

This circuit uses resistors 204a (Rb1) and 204b (Rb2) to cancel out the unwanted transmit signals coming through resistors 205a (R2_1) and 205b (R2_2). Capacitor 206 (Co_lpf) is the output lowpass filter which is used to help meet FCC out-of-band requirements. A capacitor 207 (Ci_comp) on the telephone line side of transformer 208 compensates for transformer introduced inductive lag. Capacitor 207 serves to better match the impedance of the modem with the 600 ohm line impedance. A capacitor 209 (Caa) is provided as the input anti-aliasing filter capacitor, which, in this example, sets the input lowpass filter pole at approximately 25 kHz. Capacitor 210 (Cblock) prevents DC current flow through transformer 208 and also sets the DC reference point for the RX terminals 203.

The cancellation of transmit signals in the receive paths in circuit (network) 200 results from the combination of the positive feedback of the TX+ signal through resistors 204a and 211a (Rt1) and the negative feedback provided through resistor 204b. Likewise cancellation on the other leg of the differential input is provided as the combination of the negative TX− signal through resistors 204b and 211b (Rt2) and the positive feedback provided through resistor 204a. This example assumes an ideal 600 ohm telephone line load is reflected across transformer 208 and thus, a constant amount of transmit signal fed back through resistors 205. In actual practice, the cancellation provided by network 200 is degraded when the load reflected across the transformer varies from 600 ohms. As the "null" provided by the cancellation hybrid is degraded, the dynamic range of the input ADC in the receive path of the modem is also degraded. As a rule, 20 dB or better, of hybrid cancellation ("trans-hybrid loss") is considered good.

Figure 3:
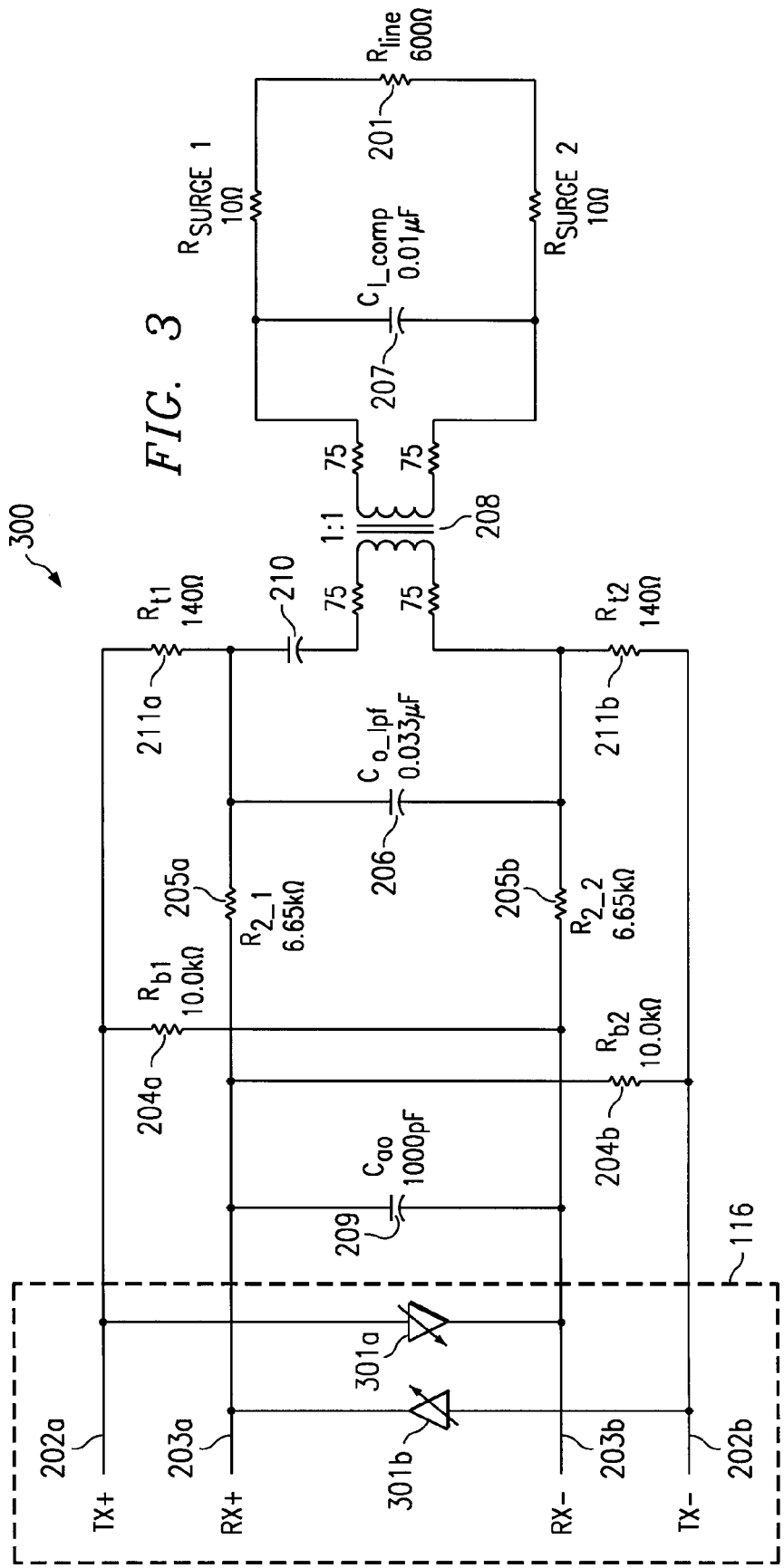
FIG. 3 is a diagram showing an exemplary hybrid network according to these principles of the present invention.

According to the principles of the present invention, with the addition of a minimal amount internal circuitry, the performance of the cancellation network can be improved and the large dynamic range of the receive path preserved. An exemplary hybrid network 300 according to these principles is shown in FIG. 3.

In hybrid circuit 300, variable gain amplifiers 301a and 301b have been added to the cancellation paths in parallel with resistors 204a and 204b. Preferably, these amplifiers are disposed on the modem chip 116 itself. In the illustrated embodiment, the gain range for each amplifier 301 is −10 dB to −30 dB. Additionally, resistors 204 are slightly increased to 10 kohm to ensure that the additional cancellation provided by the internal negative feedback stages will not increase the echo for most loading conditions. As a protection against such cases, the internal feedback stages may be completely disabled and the interface operated exactly as hybrid circuit 200. The step size of the feedback gain network is 1.25 dB. This provides 16 steps of negative feedback from −10 dB to −30 dB, plus mute/disable. Additionally, the feedback network is architected such that RX and TX pin loadings are not affected. The use of this adjustable feedback network is performed during a modem "training" sequence where the optimal feedback value may be determined by a modem DSP.

Figure 4:
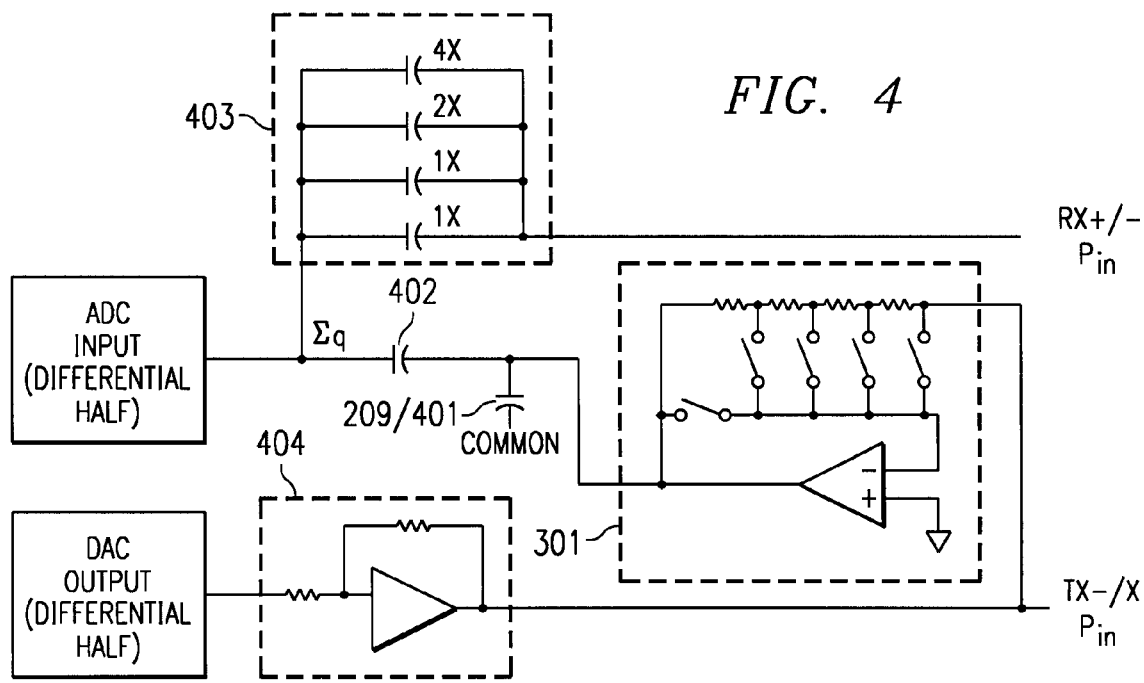
FIG. 4 is a diagram showing further details of one half of the transmit and receive differential ports of FIG. 3.

FIG. 4 illustrates in further detail one half of the transmit and receive differential ports to modem 116. In this embodiment, variable gain feedback amplifiers 301 are each implemented as inverting op-amp with tapped resistor based gain. Feedback anti-aliasing is achieved by an internal (small) capacitor 401 on the amplifier output. Summing with the signal on the RX pin is performed by charge summation as noted Σq with separate sampling capacitors 402 with fixed 0 dB gain for feedback and input sampling capacitor networks 403 with variable 0, 6, 12, and 18 dB gain settings on each of the RX input terminals 203. Low impedance drivers 404 are provided on the transmit (TX) terminals.

Figure 5:
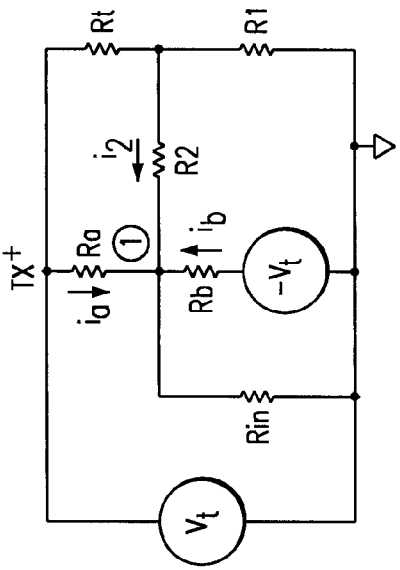
FIG. 5 is a diagram showing a half-circuit model of the circuitry of FIGS. 3 and 4.

The theory of operation for hybrid circuitry 300 can be briefly described in conjunction with the half-circuit model shown in FIG. 5. If a controlled output impedance amplifier, such as that described in co-assigned U.S. Pat. No. 5,121,080 by Scott, III, et. al, and incorporated herein by reference, is used, the current in $i_b$, can be varied by changing the resistance $R_b$, to compensate for the mis-matching in the hybrid network. This configuration uses the normal low output impedance line driver 404 (FIG. 4) for TX+ and TX− ($i_a$ and $i_2$) and uses the variable output impedance driver for TX2+ and TX2− ($i_b$).

FIG. 5 is a RX+ receiver input circuit model. (Note: the telephone line resistance $R_L = R_L/2$ for the half circuit model). Equation 1 is the KCL node equation at the receiver input, Node 1:

$$\frac{-V_1}{R_{IN}} + \frac{V_T - V_1}{R_a} + \frac{-V_T - V_1}{R_b} + \frac{V_2 - V_1}{R_2} = 0 \qquad (1)$$

Equation 2 is the KCL node equation at the transformer pin, Node 2:

$$\frac{V_T}{R_a} - \frac{V_T}{R_b} + \frac{V_2}{R_2} = 0 \qquad (2)$$

The resistances are rewritten as conductances and the set of equations are used to derive the transfer function $V_1/V_T$, at the receiver input:

$$-V_1 G_{in} + (V_T - V_1)G_a + (-V_T - V_1)G_b + (V_2 - V_1)G_2 = 0 \qquad (1a)$$

$$-V_1(G_{in} + G_a + G_b + G_2) + V_T(G_a - G_b) + V_2 G_2 = 0 \qquad (1b)$$

$$(V_1 - V_2)G_2 + (V_1 - V2)G_r - V_2 G_1 = 0 \qquad (2a)$$

Solving for $V_2$:

$$V2 = \frac{V_1 G_2 + V_T G_T}{G_2 + G_r + G_1} \qquad (2b)$$

Using (1b) and (2b), we get the transfer function from the half-circuit model of the hybrid shown in Equation 3:

$$\frac{V_1}{V_T} = \frac{G_a - G_b + \frac{G_2 G_r}{G_2 + G_r + G_1}}{G_{ia} + G_a + G_b + G_2 - \frac{G_2^2}{G_2 + G_t + G_1}} \quad (3)$$

To solve for $G_b$, when the other resistor values are known, set $V_1=0$ and rearrange (3)

$$G_b = G_a + \frac{G_2 G_T}{G_2 + G_T + G_1} \quad (4)$$

It can be seen from Equation 4 that changes in the conductances $G_a$, $G_2$, $G_T$, or $G_1$, may be appropriately matched by a change in the conductance $G_b$. For example, in order to bound the solution of the hybrid resistors, a specific source impedance must be chosen for the hybrid network, looking out from RX+ in the half-circuit model. This is chosen to be 4 kΩ in the following example. Other source impedances may be used resulting in different absolute resistor values but the same concepts of matching impedances still follow.

For a transformer impedance of 600 Ω, the resistor values are:

Ra=13.65 kΩ

Rb=9.29 kΩ

R2=14.395 kΩ

Rt=300 Ω

R1=300 Ω (½ the telephone line impedance)

In this example, the amount of transmit signal present on the receiver input pin from Equation 3 is given as −92.6 dB. If the load impedance changes from 3000 to 450 Ω (matching with a 900 Ω transformer impedance), the amount of transmit signal present on the receiver input pin from Equation 3 increases to −32.2 dB. Using Equation 4, the adjusted $R_b$ value for optimal cancellation is 8.74 kΩ. With this value, the amount of transmit signal present on the receiver input pin from Equation 3 is given as −99.0 dB.

If the resistor values are optimized for 900 Ω transformer impedance, the values are:

Ra=13.666 kΩ

Rb=9.298 kΩ

R2=14.32 kΩ

Rt=450 Ω

R1=450 Ω (½ the transformer impedance)

The amount of transmit signal present on the receiver input pin from Equation 3 is given as −117.6 dB. If the load impedance changes from 450 Ω to 300 Ω (matching with a 600 Ω transformer impedance), the amount of transmit signal present on the receiver input pin from Equation 3 increases to −32.0 dB. Using Equation 4, the adjusted $R_b$ value for optimal cancellation is 9.924 kΩ With this value of $R_b$, the amount of transmit signal present on the receiver input pin from Equation 3 is given as −94.1 dB.

It becomes evident from the above example, the value of $R_b$, and by extension, any of the resistors $R_T$, $R_a$, and $R_2$ may be "trimmed" to improve the cancellation of the matching network.

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed is:

1. An interface for coupling a modem port with a transmission line comprising:

a hybrid converter including a variable gain amplifier coupling a transmit path of a first differential polarity and a receive path of a second differential polarity.

2. The interface of claim 1 and further comprising a resistor coupled between said transmit path and said receive path in parallel with said variable gain amplifier.

3. The interface of claim 1 wherein said transmit path of said hybrid converter comprises a resistor in series with a winding of transformer and a resistor coupled to said receive path.

4. The interface of claim 3 wherein said receive path comprises a resistor coupled in series with said winding of said transformer.

5. The interface of claim 1 wherein said variable gain amplifier comprises an operational amplifier having a tapped resistor feedback loop.

6. A hybrid circuit for interfacing a modem and a telephone line comprising:

a transformer having a first winding having first and second terminals coupled to first and second conductors of said telephone line and a second winding having first and second terminals;

a first transmit path of a first differential polarity of a pair of differential transmit paths coupled to said first terminal of said second winding;

a second transmit path of a second differential polarity of said pair of differential transmit paths coupled to said second terminal of said second winding;

a first receive path of said first differential polarity of a pair of differential receive paths coupled to said first terminal of said second winding;

a second receive path of said second differential polarity of said pair of differential receive paths coupled to said second terminal of said second winding;

a first variable gain amplifier coupling said first transmit path and said second receive path; and a second variable gain amplifier coupling said second transmit path and said first receive path.

7. The hybrid circuit of claim 6 and further comprising an anti-aliasing capacitor coupling said first and second receive paths.

8. The hybrid circuit of claim 6 and further comprising a first resistor coupling said first transmit path and said second receive path and a second resistor coupling said second transmit path and said first receive path.

9. The hybrid circuit of claim 6 and further comprising a first input sampling capacitor coupling said first amplifier and said second receive path and a second input sampling capacitor coupling said second amplifier and said first receive path.

10. The hybrid circuit of claim 9 wherein said first receive path further comprises an input sampling capacitor network disposed in parallel with said first input sampling capacitor and said second receive path further comprises an input sampling capacitor network disposed in parallel with said second input sampling capacitor.

11. The hybrid circuitry of claim 6 wherein said first and second variable gain amplifiers each comprises an operational amplifier having a tapped resistor feedback loop.

12. A modem comprising:

a first signal path for receiving data, said first signal path comprising one of a differential pair of signal paths;

a second signal path for transmitting data, said second signal path comprising a second one of the differential pair of signal paths, said first and second signal paths carrying data of opposite polarity; and signal cancellation circuitry including a variable output impedance amplifier circuit coupling said first and second signal paths.

13. The modem of claim 12 wherein said first signal path couples an input terminal of an integrated circuit chip with an analog to digital converter disposed on said chip and further comprises an input signal sampling capacitor network coupled in series with an input of said analog to digital converter.

14. The modem of claim 13 and further comprising a feedback sampling capacitor coupling an output of said amplifier circuit and said input of said analog to digital converter.

15. The modem of claim 12 wherein said second signal path couples an output terminal of an integrated circuit chip with a digital to analog converter disposed on said chip and further comprises a fixed output impedance amplifier circuit coupled to an input of said variable output impedance amplifier circuit.

16. A method of tuning an interface between a modem having a differential transmit port and a differential receive port and a telephone line comprising the step of:

adjusting a gain of a variable gain amplifier coupling a selected path of the transmit port and a selected path of the receive port to match an impedance of a hybrid circuit coupling the modem and the telephone line with an impedance of the telephone line, the selected path of the transmit port and the selected path of the receive port carrying signals of different polarities.

17. The method of claim 16 and further comprising the step of adjusting a gain of a second variable gain amplifier coupling a second selected path of the transmit port with a second selected path of the receive port.

18. The method of claim 16 and further comprising the step of sampling an output of the variable gain amplifier with a sampling capacitor.

19. The method of claim 16 wherein said step of adjusting the gain of the variable gain amplifier comprises the substep of adjusting a resistance in a feedback path of the variable gain amplifier.

* * * * *